G. W. SMITH.
ANTISIPHON TRAP.
APPLICATION FILED MAR. 26, 1909.

945,423.

Patented Jan. 4, 1910.

WITNESSES
S. M. Gallagher
H. W. Burton

INVENTOR
George W. Smith
BY
ATTORNEY

UNITED STATES PATENT OFFICE.

GEORGE W. SMITH, OF PLEASANTVILLE, NEW JERSEY.

ANTISIPHON-TRAP.

945,423.  Specification of Letters Patent.  Patented Jan. 4, 1910.

Application filed March 26, 1909. Serial No. 485,923.

*To all whom it may concern:*

Be it known that I, GEORGE W. SMITH, a citizen of the United States, residing at Pleasantville, in the county of Atlantic and State of New Jersey, have invented a certain new and useful Improvement in Antisiphon-Traps, of which the following is a specification.

My invention relates to a new and useful improvement in anti-siphon traps, for use in connection with bath-tubs and lavatories, and has for its object to provide an exceedingly simple and effective device of this character which will prevent the trap from siphoning which would allow the obnoxious gases to return through the pipes.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
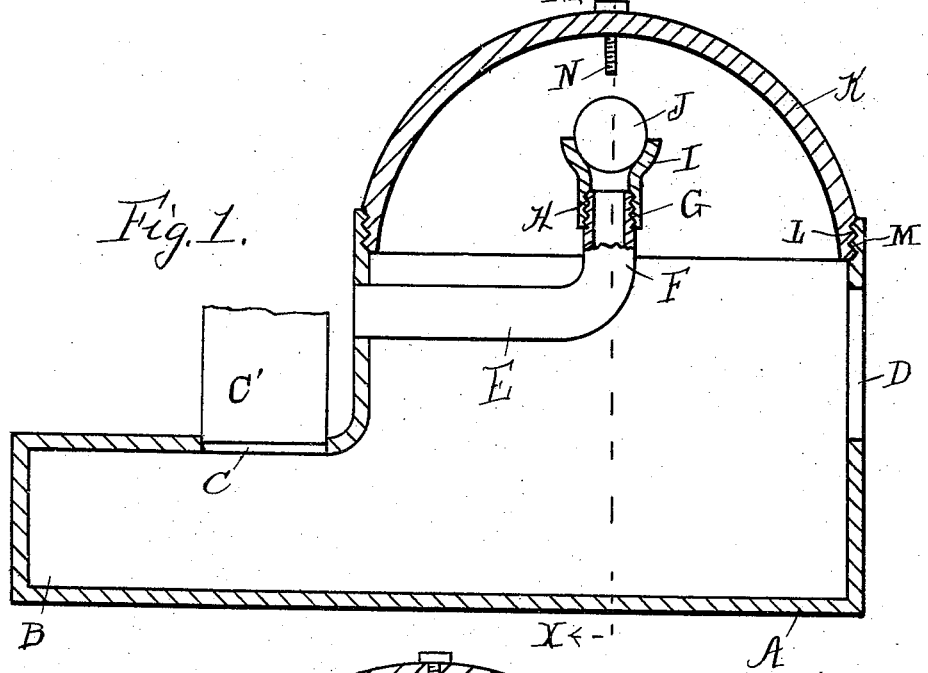
Figure 2:
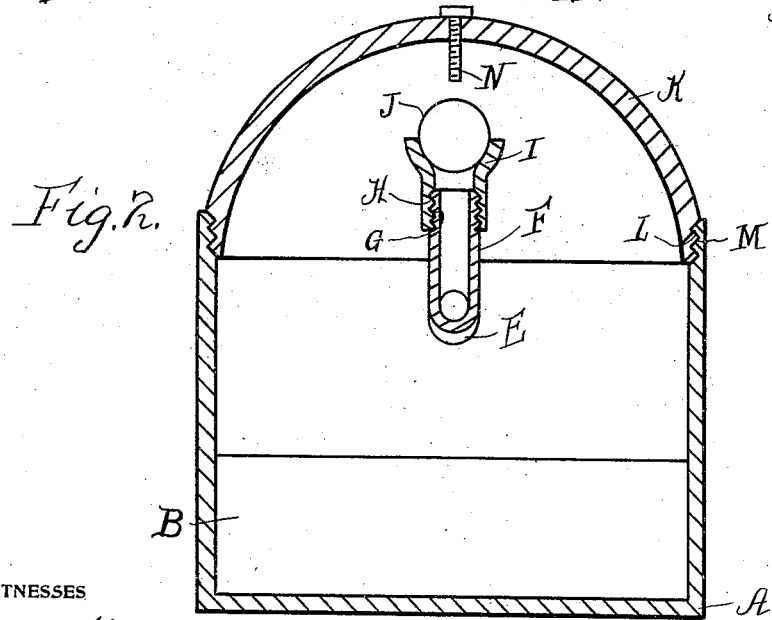

Figure 1 is a longitudinal sectional view of my improved trap. Fig. 2, a section at the line $x$—$x$ of Fig. 1 looking in the direction of the arrows.

In carrying out my invention as here embodied, A represents the body of the trap, having an extension B formed therewith. In the upper part of the extension B is formed the inlet opening C, to which may be attached a suitable inlet pipe C'.

In the rear of the body A is formed an outlet opening D whereby an outlet pipe may be attached to the trap, the bottom of said opening being above the opening C.

Attached to the body of the trap at some suitable point and extending inward is an air inlet pipe E, the inner end of which is bent at right angles to the rest of the pipe so that it will be in a vertical position, as indicated by F, and on this end are formed the male threads G, which are adapted to engage the female threads H formed on the lower end of the valve seat I, into which fits the valve J.

K denotes a dome provided with male threads L adapted to engage the female threads M formed on the inner sides of the upper end of the body of the trap A. In the upper end of this dome is threaded a set screw N, the lower end of which may be brought in proximity to the valve J so as to prevent the same from leaving its seat I when the air is being drawn through the air inlet E.

In practice, the waste water will enter through the inlet C, pass through the trap and out of the outlet D. As the water passes through the trap it will form a vacuum therein which would allow the water to siphon from the trap were it not for the inlet pipe E. Instead of a vacuum being formed air will be drawn in through the air inlet E causing sufficient water to remain within the trap to prevent the obnoxious gases returning through the inlet C. When a sufficient amount of air has passed through the inlet E the valve J will at once return to its seat I, thus cutting off the possibility of the gases escaping through the inlet pipe E.

Of course I do not wish to be limited to the exact details of construction here shown as the air inlet pipe E may be of sufficient length to extend through the wall of a building so that should there be any escape of the gases through the air inlet pipe E they would pass out into the open air.

Having thus fully described my invention, what I claim as new and useful is—

1. In an anti-siphon trap, the combination with a body provided with an outlet and having an extension formed therewith provided with an inlet, internal threads formed on the upper end of the body, an air inlet pipe secured to the body, the inner end of said pipe being bent at right angles and having threads formed thereon, a valve seat having threads formed on the lower end thereof fastened to the air inlet pipe, a valve fitting the seat, a dome provided with external threads on its lower end adapted to engage the threads on the body and a set screw passing through the dome for adjusting the rise and fall of the valve.

2. In an anti-siphon trap, the combination with a body provided with an outlet and having an extension provided with an inlet, of a dome detachably secured thereto, an air inlet pipe secured to the body, a valve seat detachably secured to the air inlet pipe, a valve fitting the seat, and means attached to
5 the dome for adjusting the rise and fall of the valve as specified.

In testimony whereof, I have hereunto affixed my signature in the presence of two subscribing witnesses.

GEORGE W. SMITH.

Witnesses:
 ARTHUR P. RYON,
 JOHN M. HILTON.